US008538848B1

(12) United States Patent
Myhrvold et al.

(10) Patent No.: US 8,538,848 B1
(45) Date of Patent: Sep. 17, 2013

(54) REVENUE ALLOCATION FOR BUNDLED INTELLECTUAL PROPERTY TRANSACTIONS

(75) Inventors: Nathan P. Myhrvold, Medina, WA (US); Peter N. Detkin, Los Altos, CA (US); Gregory D. Gorder, Seattle, WA (US); Edward K. Y. Jung, Bellevue, WA (US)

(73) Assignee: IVP Holdings I, LLC, Bellevue, WA (US)

( * ) Notice: Subject to any disclaimer, the term of this patent is extended or adjusted under 35 U.S.C. 154(b) by 1337 days.

(21) Appl. No.: 11/193,302

(22) Filed: Jul. 29, 2005

(51) Int. Cl.
*G06Q 40/00* (2012.01)
(52) U.S. Cl.
CPC ..................................... *G06Q 40/00* (2013.01)
USPC ....................................................... 705/36 R
(58) Field of Classification Search
CPC ....................................................... G06Q 40/00
See application file for complete search history.

(56) References Cited

U.S. PATENT DOCUMENTS

| | | | |
|---|---|---|---|
| 5,220,500 A | 6/1993 | Baird et al. | |
| 5,704,045 A | 12/1997 | King et al. | |
| 5,775,734 A * | 7/1998 | George, Jr. ...................... | 283/57 |
| 5,991,751 A | 11/1999 | Rivette et al. | |
| 6,102,961 A | 8/2000 | Lee et al. | |
| 6,173,280 B1 * | 1/2001 | Ramkumar et al. ............... | 707/6 |
| 6,282,653 B1 | 8/2001 | Berstis et al. | |
| 6,330,547 B1 | 12/2001 | Martin | |
| 6,556,992 B1 * | 4/2003 | Barney et al. ...................... | 707/6 |
| 6,665,656 B1 | 12/2003 | Carter | |
| 6,687,710 B1 | 2/2004 | Dey | |
| 6,928,416 B1 * | 8/2005 | Bertash ............................. | 705/26 |
| 7,099,849 B1 * | 8/2006 | Reeder et al. .................... | 705/59 |
| 7,805,382 B2 * | 9/2010 | Rosen et al. ................... | 705/321 |
| 2002/0116211 A1 * | 8/2002 | Hatakeyama ....................... | 705/1 |
| 2002/0198847 A1 * | 12/2002 | Fahraeus ........................... | 705/59 |
| 2003/0004843 A1 | 1/2003 | Frain | |
| 2003/0046105 A1 | 3/2003 | Elliott | |
| 2003/0061133 A1 | 3/2003 | Nutter et al. | |
| 2003/0182202 A1 | 9/2003 | Eason | |
| 2003/0200216 A1 * | 10/2003 | Hayes et al. ....................... | 707/9 |
| 2003/0225653 A1 * | 12/2003 | Pullman .......................... | 705/36 |
| 2004/0122743 A1 * | 6/2004 | Hoke, Jr. ......................... | 705/26 |
| 2004/0148191 A1 * | 7/2004 | Hoke, Jr. ............................ | 705/1 |
| 2004/0153388 A1 * | 8/2004 | Fisher et al. ..................... | 705/36 |
| 2004/0186738 A1 | 9/2004 | Reisman | |
| 2005/0149401 A1 | 7/2005 | Ratcliffe et al. | |

(Continued)

OTHER PUBLICATIONS

Larry Horn, "Alternative approaches to IP management: One-stop technology platform licensing," Journal of Commercial Biotechnology, London: Jan. 2003, vol. 9, Iss. 2, p. 119, 9 pgs.*

(Continued)

*Primary Examiner* — Bruce I Ebersman
(74) *Attorney, Agent, or Firm* — Lowe Graham Jones PLLC

(57) ABSTRACT

Methods, systems, and business processes for the fair allocation and sharing of future revenues from the licensing of IP assets associated with to a plurality of heterogeneous entities are provided. Example embodiments provide a bundled and tiered revenue allocation scheme "BTRAS," which can be used to dynamically determine allocations to beneficiaries based upon attributes of the licensing transaction and the contribution of each asset to the transaction. Transaction sensitivity weighting factors can be used to measure the contribution of each asset. This abstract is provided to comply with rules requiring an abstract, and it is submitted with the intention that it will not be used to interpret or limit the scope or meaning of the claims.

28 Claims, 6 Drawing Sheets

(56) References Cited

U.S. PATENT DOCUMENTS

| | | | |
|---|---|---|---|
| 2005/0149420 A1* | 7/2005 | Hagelin | 705/35 |
| 2005/0222959 A1* | 10/2005 | Brager | 705/54 |
| 2006/0053080 A1* | 3/2006 | Edmonson et al. | 705/59 |
| 2006/0200399 A1* | 9/2006 | Diaz et al. | 705/36 R |
| 2007/0208669 A1* | 9/2007 | Rivette et al. | 705/59 |
| 2012/0158612 A1* | 6/2012 | Robertson | 705/36 R |

OTHER PUBLICATIONS

Declaration of Lily C. Guse, Jan. 14, 2009, 8 pages.

* cited by examiner

REVENUE ALLOCATION FOR BUNDLED INTELLECTUAL PROPERTY TRANSACTIONS

TECHNICAL FIELD

The present disclosure relates to methods and systems for sharing revenue generated by transactions that involve intellectual property assets and, in particular, to methods and systems for allocating royalties, or other types of revenue, based upon a determination of the various characteristics of an intellectual property asset.

BACKGROUND

Intellectual property assets ("IP assets") such as patents, patent applications, copyrights, trademarks, inventions, trade-secrets, know-how, etc. are many times the subject of licensing or similar transactions in which a seller (or other type of licensor) of the IP asset trades or transfers a set of intellectual property rights ("IP rights") for some kind of compensation, for example, payment of a fee. An IP right transfer may include, for example, outright sales of IP assets, an exclusive license or a non-exclusive license in the IP asset that grants different types of control over the asset, such as the ability to make, use, sell, or import products or services covered by the asset or the ability to sublicense the asset, or similar rights transfers. Such transfers may include a variety of other features, such as geographic limitations, field limitations, time periods, and a variety of other features. Typically, the buyer (or other type of licensee or transferee) of the IP rights pays the licensor an amount of money based upon an agreement as to what one or both of the parties to the transaction considers the worth of the IP asset and the IP rights at the time of the transaction.

Different techniques exist for establishing or assigning a measure of value to an IP asset, including those favored by persons such as professional accountants and intellectual property ("IP") valuation specialists. Such methods include, for example, approximating the value of an IP asset based upon its cost-basis (book value), its market value (as it might be sold on a "theoretical" open market), or an estimated future income stream (income valuation). All of these financial techniques have limitations as to their efficacy, for example, the cost of obtaining an IP asset may have little or no correlation to the ultimate worth of the IP asset. For example, filing and prosecuting a patent application and paying maintenance fees may total an amount of approximately $20,000 to $30,000, whereas a license to the patent once issued, if essential to a potential licensee company's product line, might cost the licensee hundreds of thousands of dollars. Similarly, the market value technique may not yield a reasonable approximation of an IP asset's value, because input numbers are based upon hypothetical theories as to the price of the asset on an open market. Since there may not be a truly open market for many types of IP assets, these numbers are sometimes based upon a set of potentially unrealistic assumptions. Similarly, a future income stream model experiences a corresponding susceptibility to valuation shortfalls. Thus, regardless of the financial model used, the current value assigned to the IP asset based upon conventional techniques may not be reflective of its actual value in the future.

In a transaction involving a transfer of IP assets, the amount, valuation, and other characteristics of consideration to be paid by a licensee (or buyer or other transferee) may be specified in variety of ways. For example, consideration may be designated as a fixed payment, a royalty expressed over some period of time, or some combination of both. For example, a fixed payment may be made by the licensee or other transferee up front along with periodic royalty payments over a designated term. In some instances, the licensed IP rights may include provisions and terms under which the licensee may sublicense the IP asset. In such cases, the royalty may be expressed as a percentage of future revenue from sublicense transactions when or if they occur.

As long as all of the IP assets in a single or sequence of related transaction(s) trigger royalties to the same entity (e.g., the original seller or licensor), as, for example, may occur when a set of patents originally belonging to the same entity are sublicensed together, the royalty payments received by the original licensor likely appear "fair," as the licensor and licensee (or their predecessor entities) each contributed input into a royalty agreement that contemplate licensing the IP asset by itself or in conjunction with other IP assets associated with the same entity. However, in today's intellectual property landscape, where companies or other IP holders sometimes seek to expand their portfolios of IP assets for many different reasons, including to insure freedom to operate, it is conceivable that the purchaser (or licensee) of these assets may desire to further license (or sublicense if applicable) different patents or other types of IP assets originating from a multiplicity of different sources (e.g., the original licensors) and/or in which one or more entities may hold beneficial interests (e.g., investors, distributors, vendors, employees, contractors, or similar). For example, a licensee (as a sub-licensor) with a diverse portfolio of a variety of patents and IP rights associated with those assets may wish to sublicense hundreds of patents, some important and some not, for such purposes as creating a strategic and more powerful relationship with a sub-licensee vis-à-vis a common competitor. The sub-licensor may be faced with potentially paying royalties to each original licensor of each IP asset that was licensed as part of the sublicense transaction, regardless of whether any one particular patent was crucial to the deal. To the original licensor of the "critical, deal-making" patent, the fact that the original licensors of other "lesser" patents also receive royalties may seem somewhat unfair. Also, unless the sub-licensor is careful, a licensing transaction may be structured that results in paying royalties (as percentages of revenue generated by the transaction) in excess of 100% of the generated revenue. Such a transaction may simply result in an bad deal.

DETAILED DESCRIPTION

Embodiments described herein provide methods, systems, and business processes for the fair allocation and sharing, among a plurality of potentially heterogeneous entities, of future revenues from intellectual property ("IP") licensing transactions that involve IP assets associated with one or more of the plurality of entities. Example embodiments provide a bundled and tiered revenue allocation scheme ("BTRAS") that can be used to dynamically determine each allocation to a beneficiary based upon the relationships between or among the licensor and beneficiaries, attributes of the licensing transaction, and/or the characteristics of or role played by each respective IP asset in the transaction. Thus, an IP asset that participates in several different licensing transactions, each potentially including a different bundle of IP assets, may perform different roles (e.g., embody a different contribution to each transaction) and result in different royalty allocations to the provider of that asset (the "asset provider").

Use of the BTRAS may enable each potential beneficiary of a licensing transaction payment (licensing revenue) to perceive that she or he has received a "fair" allocation. In some cases, this perception may exist because the allocation can be transaction-sensitive in that it is based upon some measure of relevance and importance of each respective IP asset to each licensing transaction as a separate event. In addition, fairness or perceived fairness may be enhanced because the value (e.g., contribution) of each IP asset to the transaction can be determined dynamically—at the time the transaction occurs, and not solely in advance based upon some arbitrary set of assumptions. (The value of each IP asset can also be determined by combining dynamic measurements and/or calculations with information gleaned in advance of the transaction.) Basing an allocation on an actual transaction tends to value an IP asset as a measure of real market worth to the particular transaction, yet still allows the allocation to be deterministically negotiated and contracted for in advance (when the IP asset rights are initially transferred) even though the actual amount that will result from the future allocation is not yet known. Also, BTRAS based allocations can grant higher rewards to those entities originating IP assets that are key to a licensing deal, thereby also potentially increasing a potential perception of fairness to the parties involved.

Figure 1:
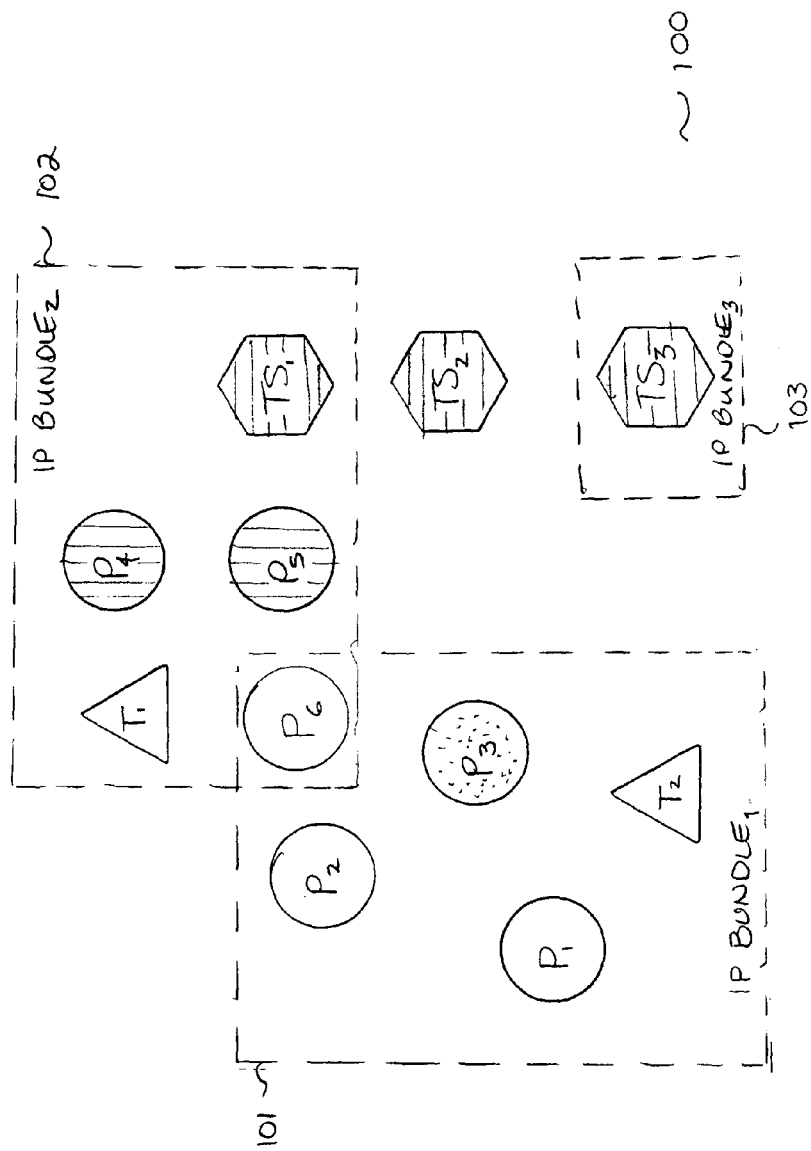
FIG. 1 is an example block diagram of IP bundles formed for use in IP licensing transactions from a portfolio of IP assets.

FIG. 1 is an example block diagram of IP bundles formed for use in IP licensing transactions from a portfolio of IP assets. In FIG. 1, asset portfolio 100 encompasses a plurality of IP assets from a multitude of different sources—IP asset providers. Example asset portfolio 100 comprises a plurality of patents and/or patent applications, labeled "$P_1$," "$P_2$," "$P_3$," "$P_4$," "$P_5$," and "$P_6$;" a plurality of trademarks "$T_1$" and "$T_2$;" and a plurality of trade secrets "$TS_1$," "$TS_2$," and "$TS_3$." As demonstrated by the different shading of the IP asset representations, assets $P_1$," "$P_2$," "$P_6$," "$T_1$," and "$T_2$" have been bought, licensed or otherwise provided from a first asset provider; asset "$P_3$" has been provided from a second asset provider; assets "$P_4$," and "$P_5$" have been provided from a third asset provider; and assets "$TS_1$," "$TS_2$," and "$TS_3$" have been provided from a fourth asset provider. Note that one or more of the IP assets in one or more of the sets may have been generated by or otherwise previously acquired by the holder of the asset portfolio (the licensor) acting as an asset provider.

The different IP assets from asset portfolio 100 may be formed into a variety of bundles of IP assets ("IP bundles") for licensing transactions and other purposes. In addition, these IP bundles may include other tangible and intangible assets (not shown). In FIG. 1, three IP Bundles have been formed, presumably for three separate IP licensing transactions: IP Bundle 101, IP Bundle 102, and IP Bundle 103. Each IP bundle comprises potentially different types of IP assets (see, e.g., IP Bundles 101 and 102) or assets of one type only (see, e.g., IP Bundle 103). Moreover, a single IP asset may be a member of more than one bundle. For example, patent asset $P_6$ is a member of both IP Bundle 101 and IP Bundle 102. Note that the value of this asset may be different for each bundle. One example occurrence might be where patent asset $P_6$ may have been asserted against a potential infringer who has now become a licensee of IP Bundle 102, yet patent asset $P_6$ may be a patent in the same family as patents $P_1$" and "$P_2$ and therefore desired to be licensed together by a licensee of IP Bundle 101. Other examples may include situations in which the fields or other characteristics of the transactions or IP bundles vary.

Figure 2:
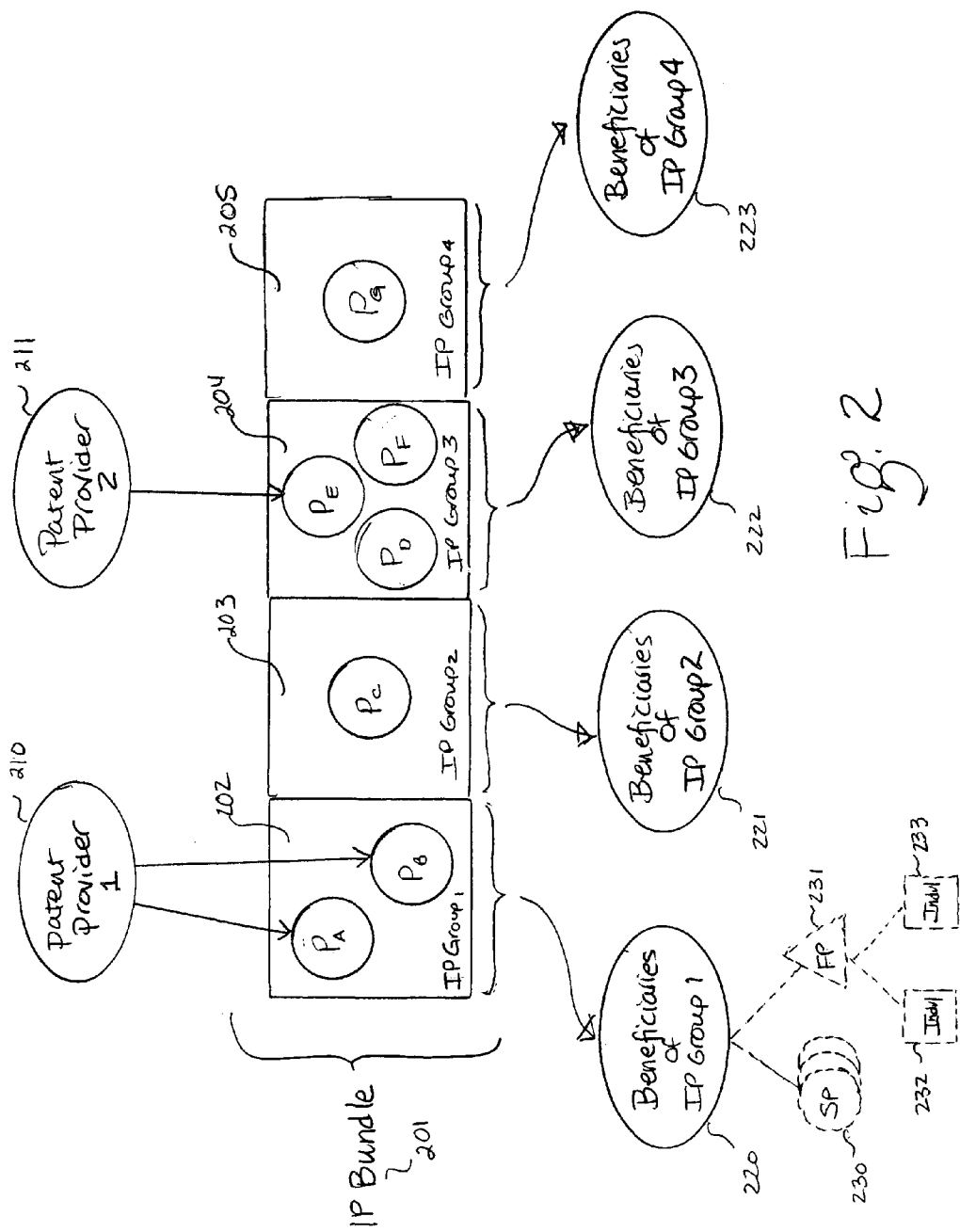
FIG. 2 is an example block diagram of potential relationships of IP assets to IP asset providers and other beneficiaries.

FIG. 2 is an example block diagram of potential relationships of IP assets to IP asset providers and other beneficiaries. Asset providers, such as patent providers, trademark provides, and the like, are just one type of beneficiary. Other beneficiaries may include, for example, investors, financial partners, strategic partners, vendors, employees, contractors, and/or other parties interested in participating in revenue sharing. In FIG. 2, IP Bundle 201 comprises 7 different IP assets, here shown as patents/patent applications "$P_A$" through "$P_G$." The example illustrated shows two different IP asset providers: patent (asset) provider 210 and patent (asset) provider 211, who have contributed 3 of the 7 IP assets (patents "$P_A$" "$P_B$," and "$P_E$"). Note that other IP asset providers may have contributed the other assets to the asset portfolio; however, these other IP asset providers are not of present interest as no revenue sharing arrangements are outstanding to them in the example shown.

In some embodiments of a BTRAS, different types of beneficiaries are allocated portions of received licensing revenue in tiers—as part of different priority levels of revenue sharing participants. (Note as well that beneficiaries of different types may belong to the same tier, yet receive different allocations.) For example, FIG. 2 shows the 7 different IP assets as belonging to different IP Groups, IP Group$_1$ 202-IP Group$_4$ 205, each of which is associated with one or more beneficiaries of the group. For example, IP Group$_1$ 202 comprises patents "$P_A$" and "$P_G$," which are associated with beneficiaries 220. Similarly, IP Group$_2$ 203 comprises patent "$P_C$," which is associated with beneficiaries 221; IP Group$_3$ 204 comprises patents "$P_D$," "$P_E$," and "$P_F$," which are associated with the beneficiaries 222; and IP Group$_4$ 205 comprises patent "$P_G$," which is associated with the beneficiaries 223. While this exemplary embodiment is presented in terms of groups including patents, other types of IP assets can be similarly incorporated and are understood to be included in the techniques described herein.

In one example embodiment, when revenue subject to a BTRAS is received, allocations are made first to the beneficiaries that are IP asset providers (typically to satisfy royalty payments in exchange for IP rights to the asset) such as patent providers 210 and 211, and then allocations are made to a next tier of beneficiaries—such as beneficiaries 220-223. In some embodiments, the beneficiaries are further divided into a hierarchy of tiers (thereby supporting any number of tiers of beneficiaries) and portions can be allocated progressively the further in depth the beneficiary belongs. While in some approaches, successive tiers may be receive progressively smaller allocations, this may not be the case in other arrangements. For example, beneficiary group 220 may be further divided into at least two more tiers having more than one type of beneficiary: a first tier that includes strategic partners 230 and financial (corporate) partners 331, and a second tier that includes individual investors 232 and 233. Other arrangements of tiers and beneficiary types are possible and contemplated by the techniques described herein.

One should note that even within a tier, the beneficiaries each may be under a different revenue allocation scheme although they share the same cumulative allocation (portion) of revenue. For example, the beneficiaries of each IP group may not only receive an allocation that is based upon the contribution of the IP assets to the licensed bundle, but also may receive an allocation that is adjusted for the particular IP group in which the asset belongs. In addition, the allocations and/or relative allocations of the beneficiaries relative to each other may result in different allocations for different beneficiaries or in different allocation computations. Also, the total makeup of beneficiaries in a particular group and/or the presence of certain beneficiaries may affect allocations and/or allocation computations. Other combinations and permutations are also possible and contemplated.

In an example bundled and tiered revenue allocation scheme, each IP asset that contributes to a licensing of a group of IP assets licensed as part of a single transaction or a series of related transactions (an "IP bundle") is assigned a transaction weight based upon a determination of one or more transaction sensitivity weighting factors, alone or in various formulations. (The transaction weight, alone or in combination with other factors, may be indicative of an allocation.) The transaction sensitivity weighting factors can provide objective and subjective measures of the importance of one IP asset relative to the other IP assets licensed in the IP bundle. For example, in one embodiment, the weighting factors determine importance (for example, relevance) as a function of one or more of attributes the IP asset itself, the asset's role in the licensing deal, the types and/or identities of beneficiaries that are slated to receive an allocation from the licensing transaction revenue, and the role of the licensor in effectuating a successful transaction (e.g., closing a licensing deal). Other factors or discretion can be easily integrated into a BTRAS as desired.

Attributes of the IP asset itself may include such factors as the age of the asset (such as the remaining term in years before a patent expires); litigation history of the asset; and asset specific attributes such as, for patents, geographic coverage of a family of (related) patents, the number of claims in the patent, simplicity or complexity of the claims and/or the extent to which the claims may have been interpreted, such as in a Markman hearing, breadth of potential future coverage of claims (e.g., such as based upon an analysis of open applications, doctrine of equivalence possibilities, file history limitations, quality of the specification), measures of strength or breadth of the claims such as those determined by statistical techniques and comparisons to patent populations, correlations of claims to respective markets, identification of specific instances of anticipated or actual infringement, strength of support, size or typical royalty characteristics of a corresponding market, or a variety of other valuation factors.

The asset's role in the licensing deal may result in an assignment of the asset to a category that indicates whether the asset was highly relevant (such as discussed in detail, or, for example, discussed or asserted and held valid as part of an assertion of infringement); mentioned or listed but not discussed in detail in the negotiations or not asserted as part of an assertion of infringement; related to assets that fell into the first or second categories; or otherwise included in the IP bundle. The asset's role may also include a subjective assessment as to perceived importance to the licensee and the category designation adjusted to include this assessment (as, for example, by adjusting the category to result in a higher portion of revenue if the licensing deal's terms would be substantially impaired or the deal wouldn't have happened without inclusion of the asset).

The type of beneficiary for which the allocation is being determined may also influence the resultant transaction weight assigned to an IP asset or resultant allocations. For example, different values of transaction weights (e.g., percentage designations), allocation priorities, or preferences may be applied when computing allocations for original asset providers and/or other beneficiaries such as those that have helped effect the licensing transaction or acquisition of the asset from the asset provider. Also, the different beneficial interests of a group of beneficiaries (to the extent not already taken into account by different types of beneficiaries) may influence resultant transaction weights, allocation priorities, or preferences assigned to IP assets. As mentioned, the identity of one or more beneficiaries, in and of itself or relative to the other associated beneficiaries, or vis a vis the group of IP assets in the bundle, may also contribute.

Other attributes of beneficiaries may also influence the resultant transaction weight assigned to an IP asset or resultant allocations. For example, for beneficiaries that are investors in the IP asset portfolio or other business of the licensor, the age of the investment (how early the investor provided funds), amount of investment, relative risk undertaken, potential limitations on other activities (for example, opportunity costs) may influence such values.

Also, the role of the licensor may affect the transaction weight assigned to an IP asset. For example, if the recipient of the IP asset from the asset provider (e.g., the current licensor) was given very limited rights (for example, a limitation as to field of use for potential sub-licensees for companies engaging in competition with the asset provider), then the licensor may have been forced to engage in difficult negotiations to close the deal. In such a case, the asset provider may receive a decreased allocation. In part, such reduction in allocation may be a function of corresponding difficulties or costs imposed on the licensor by the characteristics of the IP asset from the provider.

One should note that the IP assets in an IP bundle may be bought outright from an IP asset provider that is a seller, or they may be licensed (exclusively or not) from the IP asset provider with a right to further sublicense. In the latter case (assets licensed but not bought), the entity that receives the asset rights is usually more correctly termed a sub-licensor of the IP licensing transaction that is subject to BTRAS based allocations. However, for ease of description, the entity that acts as licensor or sub-licensor will be referred to as the "licensor" of the IP transaction, even when the entity is performing a sublicensing of IP assets. This party is also often the same party that performs the BRTAS based allocations.

Once the transaction weights of the IP assets participating in a licensed IP bundle have been determined, the revenue can be apportioned according to the BTRAS. The transaction weight of an IP asset (which is most often determined relative to each transaction) indicates a portion of the revenue that will be allocated to (shared among) beneficiaries of revenue generated from that asset. For example, the original asset provider of a patent, who originally licensed or sold the IP asset to the IP asset portfolio holder (now the licensor), itself may be a beneficiary of portions of revenue generated by a licensed IP bundle that includes the patent if the original license so provided.

In addition, as mentioned, the beneficiaries may be "tiered" such that some beneficiaries may be entitled to an allocation of revenue before other beneficiary allocations are performed. For example, in one embodiment, beneficiaries also include investors of the licensor. These beneficiaries may be entitled to receive a portion of the revenue (still based potentially upon the same transaction weight of the asset) only after an allocation is made to the patent provider.

Also, beneficiaries even within a same tier may share (be allocated) a revenue portion unequally, according to different priorities and preferences. For example, sometimes the needs of respective beneficiaries are incongruous and may invoke different allocation treatments. For example, beneficiaries may have different inherent fields of use, locations, etc. In addition, certain scenarios may suggest allocations that are non-linear over time or quantity. For example, a BTRAS make incorporate an allocation percentage that differs based upon the amount of revenue being allocated. Also, the makeup (or identities) of the beneficiaries may result in different allocations within a tier, even when the same transaction sensitivity weighting factors are applied. As described further below, many different combinations and permutations of allocations that take advantage of this transaction weight determination and a multitude of other factors are possible and contemplated.

Figure 3:
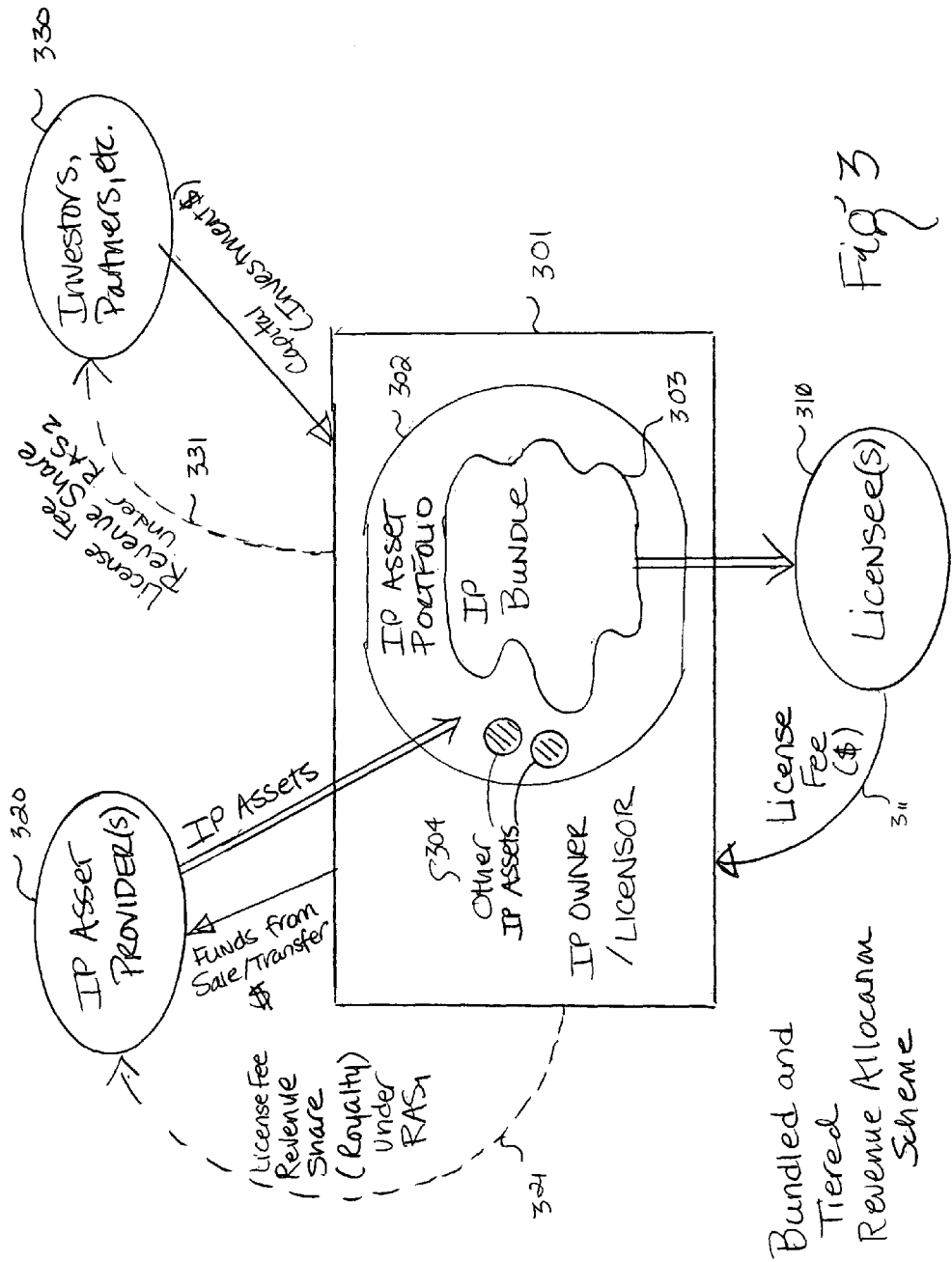
FIG. 3 is an example overview block diagram of a sample distribution of fair allocations to a plurality of types of beneficiaries of revenues resulting from an IP licensing transaction that involves an IP bundle.

FIG. 3 is an example overview block diagram of a sample distribution of fair allocations to a plurality of types of beneficiaries of revenues resulting from an IP licensing transaction that involves an IP Bundle. In FIG. 3, IP Owner/Licensor 301 is, for example, an investment fund that owns or has the ability to license a set of IP assets from an IP asset portfolio 302. Some of these assets are provided by IP asset providers 320, and some assets, for example assets 304, enter the IP asset portfolio 302 by other means, such as self generation. When the IP asset providers 320 provide assets to the fund 301, an initial fixed sum is typically distributed to the IP asset provider with a contracted promise for future revenue sharing in any licensed IP Bundles, in which the assets participate under a first revenue allocation scheme (a "RAS"). Investors and other partners 330 provide capital investments into the fund 301. These often enable the fund to purchase IP assets (for example, from the asset providers) and to conduct other business of the fund. In exchange, the fund 301 promises future revenue sharing based upon a second revenue allocation scheme ("RAS"), which may be the same or different from the first RAS. At some point, several of the IP assets are licensed to licensee 310 in an IP Bundle 303 (see, for example, FIGS. 1 and 2). In return for the license to the assets of IP Bundle 303, the licensee 310 provides a license fee 311 (and/or other consideration) to the fund 301. The license fee 311 is then allocated (and potentially distributed) to the IP asset providers 320 as revenue share allocations 321 and to other beneficiaries 330 (e.g., investors and partners) as revenue share allocations 331.

Note that, although the descriptions and examples herein refer interchangeably to IP assets, patents, or patent applications, the techniques for providing and using a bundled and tiered revenue allocation scheme are generally applicable to any type of IP asset, including but not limited to patents, patent applications, utility models, copyrights, trademarks, trade-secrets, know-how, and the like, regardless of whether these assets originate or are effective in the United States or in foreign countries, regions, or territories. In addition, the techniques for providing and using a bundled and tiered revenue allocation scheme are generally applicable to any type of IP asset, whether or not additional tangible or intangible items are included in a transaction along with the IP asset. In addition, the inclusion of other (non-IP) assets may be included in the transaction sensitivity weighting factors and thereby affect allocations. Also, although licensing transaction examples are described as involving sellers of patents, patent providers, partners, funds, etc., it will be understood that such transactions can involve any purveyor or other transferor of one or more IP rights in an IP asset. In addition, although transactions involving licensing are primarily discussed in an example embodiment, a BTRAS can be equally applied to other types of transactions that involve the allocation or distribution of shared revenue or other forms of consideration as a potentially unequal distribution that attempts to capture fairness. Also, allocations may be relative to many different metrics, including but not limited to gross revenues, net revenues, operating profit, free cash flow, net profits, or any other description relating to all or any portion of one or more transactions in which IP rights of IP assets are involved.

Also, although certain terms are used primarily herein, one skilled in the art will recognize that other terms could be used interchangeably to yield equivalent embodiments and examples. For example, it is well-known that equivalent terms in the financing field and in other similar fields could be substituted for such terms as "revenue," "fees," "beneficiaries," etc. In addition, terms may have alternate spellings which may or may not be explicitly mentioned, and one skilled in the art will recognize that all such variations of terms are intended to be included.

In addition, in the following description, numerous specific details are set forth in order to provide a thorough understanding of the described techniques. However, the present invention also can be practiced without some of the specific details described herein, or with other specific details, such as changes with respect to the ordering of the steps, mathematical algorithms employed, etc. Also, other steps or algorithms could be implemented, and in different orders, yet still achieve the fair allocation of revenues generated by licensing IP bundles.

Figure 4:
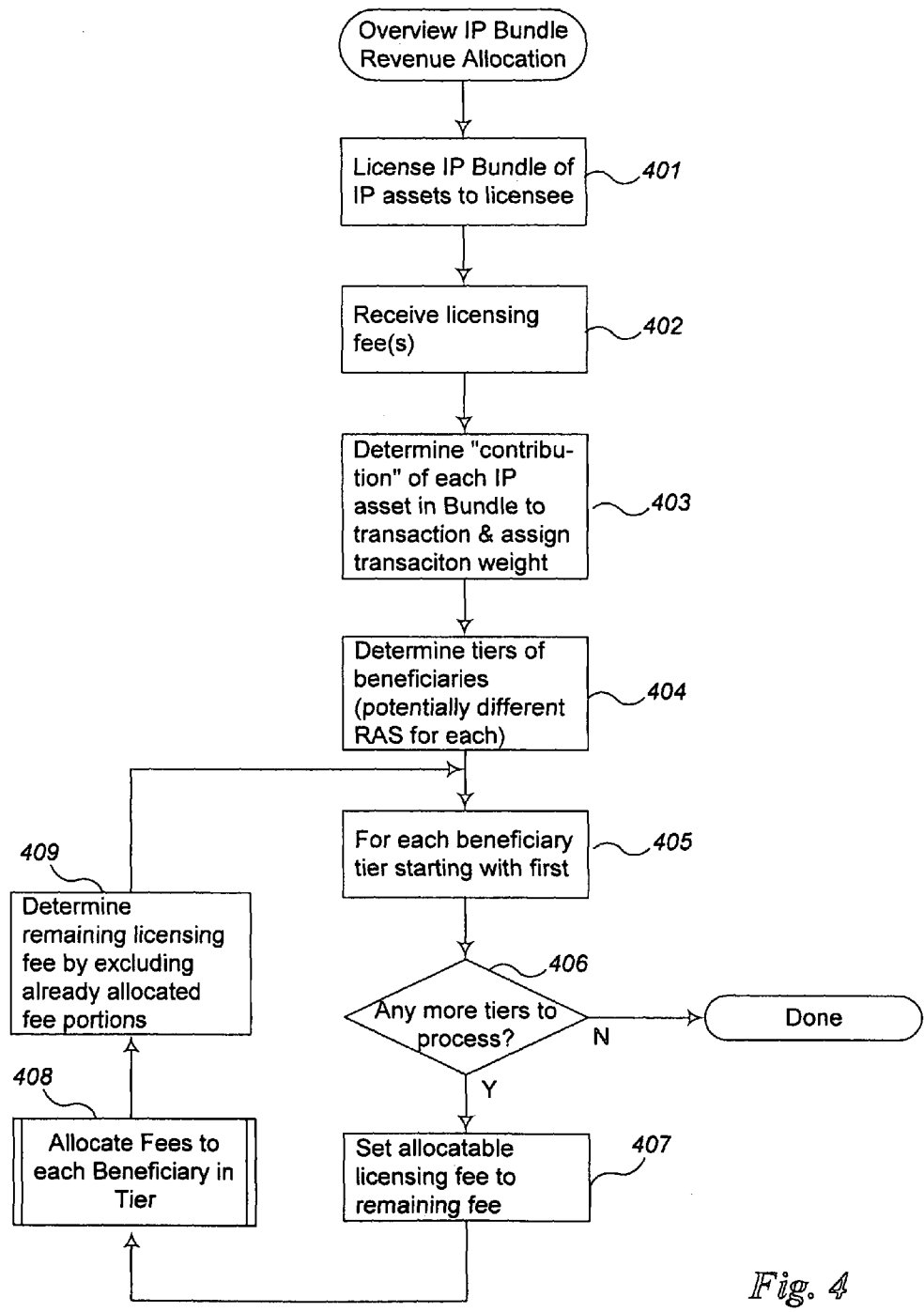
FIG. 4 is an example overview flow diagram of a process for fair allocation of revenues generated by licensing an intellectual property bundle.

FIG. 4 is an example overview flow diagram of a process for fair allocation of revenues generated by licensing an intellectual property bundle. Typically, this process is conducted by a licensor, such as fund 301 in FIG. 3. Note that, alternatively, a portion of these steps can be executed in a computer system, for example, as described with reference to FIG. 6. Although described with reference to tiered allocations, the techniques can be applied or modified to address a set of beneficiaries within a single tier (hence tier-independent). In step 401, an IP Bundle of IP assets is licensed to a licensee. In step 402, the licensor receives consideration, such as a licensing fee, from the licensee. In step 403, the licensor determines a contribution metric for each IP asset in the licensed IP bundle according to the transaction sensitivity weighting factors as described above. In step 404, the licensor determines the number of tiers to process for the allocation. In steps 405-409, the licensor performs allocations on a per tier basis and distributes a remaining licensing fee to the beneficiaries within each tier. The remaining licensing fee may be adjusted to specify only a portion of the available remaining fee, so as to preserve revenue sharing for additional tiers and/or beneficiaries. Specifically, in step 405, the licensor determines the next beneficiary tier to process. In step 406, if there are no more tiers to process, the allocation is complete. Otherwise, then in step 407, the allocable licensing fee is set to the amount of revenue remaining after the allocations attributed to the previous tier (and any other adjustments). In step 408, a series of acts are performs to allocate the allocable licensing fee to the beneficiaries associated with the current tier. Example acts are described in detail in FIG. 5. In step 409, the remaining licensing fee is recalculated to exclude the allocations just performed for the current tier (and additional adjustments if desired), and then the licensor returns to step 405 to process allocations for the next beneficiary tier.

Figure 5:
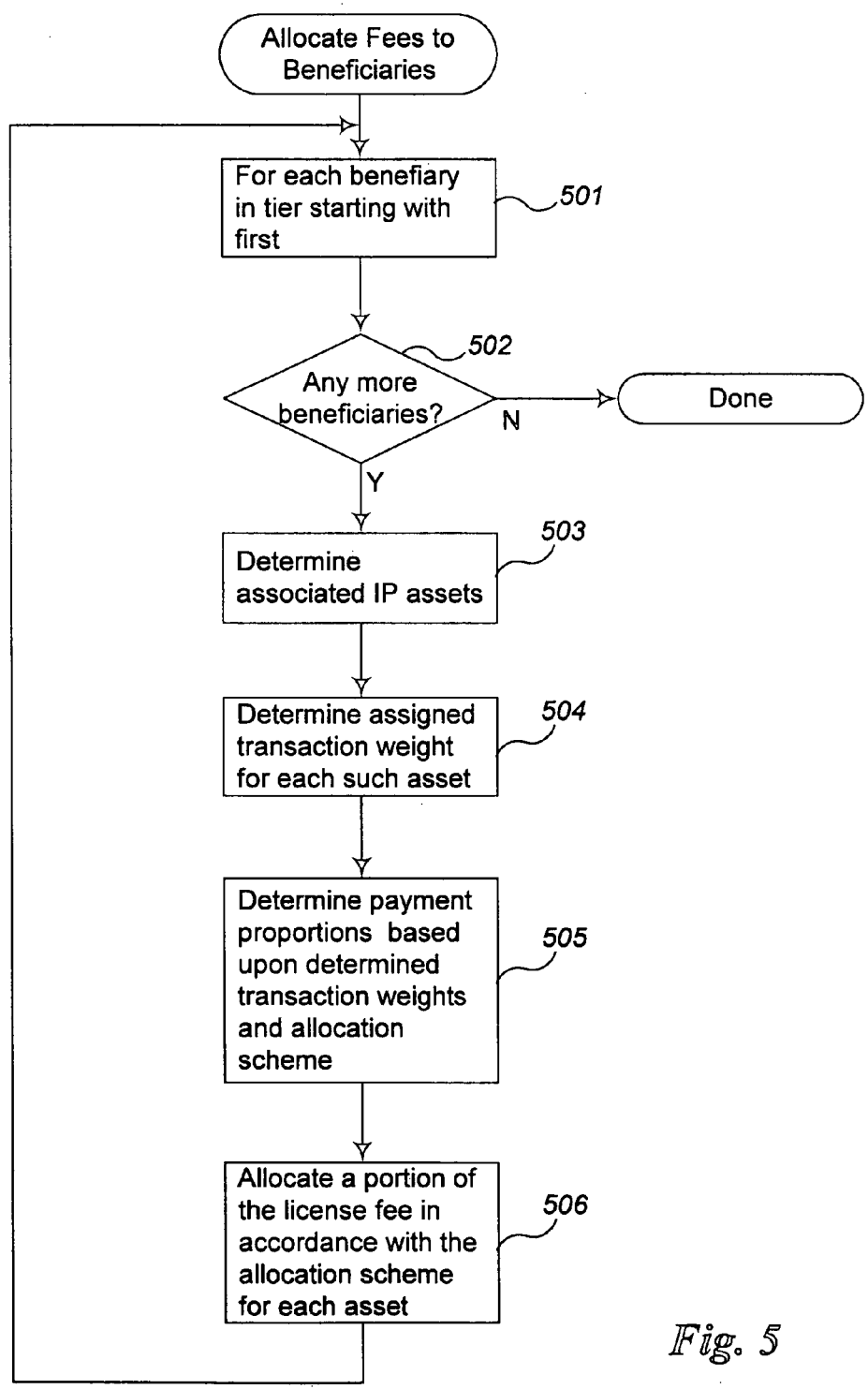
FIG. 5 is an example flow diagram of a process for determining fair allocations to one or more beneficiaries in a beneficiary tier according to an example bundled and tiered revenue allocation scheme.

FIG. 5 is an example flow diagram of a process for determining fair allocations to one or more beneficiaries in a beneficiary tier according to an example bundled and tiered revenue allocation scheme. Many alternative techniques can be integrated and yet still achieve a notion of fair allocations as provided by a bundled and tiered revenue sharing scheme. In steps 501-506, the licensor performs allocations to each beneficiary in the current tier. More specifically, in step 501, the licensor determines the next beneficiary to process. In step 502, if there are no more beneficiaries to process, the allocation for that tier is complete. Otherwise, then in step 503, the licensor determines the IP assets that are associated with beneficiaries and are part of the IP bundle. In step 504, for each such IP asset, the licensor determines and assigns a transaction weight to the IP asset as described above with reference to the transaction sensitivity weighting factors. In step 505, the transaction weight (along with potentially other factors) is used to derive a portion of the revenue that is allocable to beneficiaries of revenue generated from that asset. For example, according to one scheme described below, each weight corresponds to a category ranking, and each category ranking is associated with a percentage to be applied to the amount of allocable revenue to derive a per asset revenue amount to be distributed. In one embodiment, the percentage of allocable revenue is shared between all IP assets in the category. In other embodiments, the IP assets share in an unequal distribution. Other means of associating a transaction weight with a portion of the revenue are also contemplated. For example, relative weightings based upon the identity of or characteristics of other assets in a particular tier or based upon varying identities, makeup, and roles of the associated beneficiaries are also contemplated. In step 505, the revenue is allocated to the current beneficiary in accordance with the portion determined in step 504 and the business rules for how the beneficiaries are to divide the per asset revenue portion. For example, in an embodiment in which the revenue portion is divided by the number of assets that share that category ranking to generate a per asset revenue portion, this portion is then split between the beneficiaries associated with that asset. The licensor then returns to step 501 to process allocations for the next beneficiary.

While the exemplary process of FIGS. 4 and 5 is presented in the context of licensing, licensor, licensee, and licensing fee, the exemplary process may be applicable to other types of transactions, consideration, or other aspects of the transfers of IP rights and allocations of consideration.

The following example illustrates an hypothetical licensing transaction whose revenue is shared among two tiers of beneficiaries: patent providers and "other" beneficiaries arranged according to groups of assets (IP groups) using the techniques described in FIGS. 4 and 5. Referring back to FIG. 2, assume that a license transaction is conducted by a licensing entity such as a fund that involves at least patents and/or patent applications licensed in a single IP bundle, whose assets relate to patent providers and other beneficiaries as illustrated in FIG. 2. That is, seven patents "$P_A$" through "$P_G$" are licensed, according to four IP groups, each with beneficiaries such as investors to the fund. Three of the patents, assets "$P_A$," "$P_B$," and "$P_E$," have been sold or licensed to the fund by patent providers 1 and 2.

The licensor (the fund) is now charged with determining fair allocations to the beneficiaries based upon the IP bundle as licensed. Table 1 provides a summary of the IP assets licensed in the transaction and an indication of a transaction weight that is assigned according to an example BTRAS. In this case, only one transaction sensitivity weighting factor is taken into account: the extent to which the patent was relevant to the close of the deal. That is, each patent is rated (e.g., placed in a category) to reflect whether or not the patent was explicitly discussed in detail during the license transaction ("R1"); merely mentioned ("R2"); not mentioned, but related by either U.S. or International patent classification codes ("R3"); and not mentioned or related, but included in the IP bundle for other reasons ("R4").

TABLE 1

| Patent Asset | Category | IP Group | Investor Type and # | Patent Provider |
|---|---|---|---|---|
| $P_A$ | R1 | IP Group 1 | Investor Type1 No. B1-B4 | Provider 1 |
| $P_B$ | R2 | IP Group 1 | Investor Type1 No. B1-B4 | Provider 1 |
| $P_C$ | R1 | IP Group 2 | Investor Type2 No. F1 Investor Type1 No. B5-B7 | |
| $P_D$ | R3 | IP Group 3 | Investor Type1 No. B1 | |
| $P_E$ | R2 | IP Group 3 | Investor Type1 No. B1 | Provider 2 |
| $P_F$ | R3 | IP Group 3 | Investor Type1 No. B1 | |
| $P_G$ | R4 | IP Group 4 | Investor Type1 No. B1 | |

Other transaction sensitivity weighting factors could also be taken into account. For example, the age of a patent can influence its worth to the licensee—as commonly the case, the older the patent (less term left), the less potentially valuable it may be to the licensee. Thus, the age of each patent could be determined and if the patent has less than some chosen number years of term left, the patent's rating may be lowered one notch. For example, a 10 year old patent may be bumped from a category "R1" rating to an "R2," thereby resulting in a smaller share of the license revenue to the beneficiaries associated with the patent. In other situations, an older patent may be worth more, for example, a complex or proven patent.

After assigning a transaction weight, the fund administrator (or whomever or whatever determines and administers the allocations) is able to associate each ranking with a percentage of the revenue to be allocated. That is, for each tier of beneficiaries (assuming only one BTRAS is used), the payment percentages are applied to the license revenue to derive a per asset (per patent) revenue. In one example embodiment, the following payment percentages are applied:

R1=55%
R2=27.5%
R3=13.75%
R4=3.75%

Different percentages are of course possible and will yield different distributions of allocations. According to one scheme, all assets in a particular category share the entire revenue portion allocated to the entire category. For example, if two patents are "key" to the deal, then they would share 55% of the license revenue, which is then distributed to the beneficiaries of each patent according to the sharing rules of the tier and the beneficiaries (which may be different for each type of beneficiary, etc.). Thus, an asset's transaction weight serves as an indicator of a portion of the payment to be distributed for that asset.

Next, based upon the number of beneficiaries sharing in the asset (or the type of beneficiaries), the per asset revenue is distributed among them according to the beneficiary rules for the tier or beneficiary type. For example, Tier 1 comprises Provider 1 and Provider 2. Each of these patent providers has engaged in a royalty arrangement whereby the fund pays them based using a BTRAS when assets from these providers are included in IP bundles. In addition, these IP asset providers may be limited to a percentage of the amount allocable on a per asset per beneficiary basis. So, the patents that are associated with beneficiaries in Tier 1 include patents $P_A$, $P_B$, and $P_E$. Assuming that the license generated $1,000,000 (one million dollars) in revenue (after taking into account other expenditures such as licensing costs etc.), the determinations for these per asset revenues are as follows:

Per patent revenue for Tier 1:

$$P_A=1,000,000*(55\%/2 \text{ patents in category } R1)=\$275,000.$$

$$P_B=1,000,000*(27.5\%/2 \text{ patents in category } R2)=\$137,500.$$

$$P_E=1,000,000*(27.5\%/2 \text{ patents in category } R2)=\$137,500.$$

Thus, for $P_A$, since there is only one beneficiary, a first analysis would indicate that the beneficiary would receive the entire per asset amount. However, also assume that the percentage allocable to the IP asset providers is 10% of a per asset share. Thus, Provider 1 only receives $27,500 (=10% of $275,000) for the $P_A$ patent. Since Provider 1 is the only beneficiary in this first tier for patents $P_A$ and $P_B$, Provider 1 will receive an allocation of $41,250 ($27,500+$13,750.00). Similarly, Provider 2 is the only beneficiary in this first tier for patent $P_E$ and is limited to 10%. Thus, Provider 2 will receive an allocation of $13,750, and the total allocations determined for Tier 1 are $55,000 ($41,250+$13,750).

The net revenue available to be allocated to additional tiers is now $945,000 ($1,000,000−$55,000). Tier 2 comprises a set of beneficiary investors that have arranged to share in revenues based upon groupings of IP assets (IP Groups). Each group of beneficiaries shares according to the rules of the group. So, for example, Type2 investors may each share 1% (or any other number) of a per asset revenue, and Type1 investors may share equally the remaining revenue portion (or 99% split between the number of Type1 investors if there is only one Type2 investor).

Thus, using similar determinations to those demonstrated above, the following allocations are made:

Per patent revenue for Tier 2 is:

$$P_A=945,000*(55\%/2 \text{ patents in category } R1)=\$259,875;$$

$$P_B=945,000*(27.5\%/2 \text{ patents in category } R2)=\$129,937.50;$$

$$P_C=945,000*(55\%/2 \text{ patents in category } R1)=\$259,875;$$

$$P_D=945,000*(13.75\%/2 \text{ patents in category } R3)=\$64,968.75;$$

$$P_E=945,000*(27.5\%/2 \text{ patents in category } R2)=\$129,937.50;$$

$$P_F=945,000*(13.75\%/2 \text{ patents in category } R3)=\$64,968.75; \text{ and}$$

$$P_G=945,000*(3.75\%/1 \text{ patent in category } R4)=\$35,437.50.$$

The beneficiaries for IP Group 1 (which share in the revenues for $P_A$ and $P_B$) are Investors B1-B4. Since each shares the per patent revenues equally, each of B1-B4 is allocated $97,453 from the IP Group 1 assets (($259,875+$129,937.50)/4). The beneficiaries for IP Group 2 (which shares in the revenues for $P_C$) are Investors B5-B7 and one Investor F1 of Type 2. Investor F1 is allocated 1% which is $2,598.75. Each of B5-B7 then shares 99% of the assets of the IP Group 2 and is allocated $85,758.75 ($257,275.50/3). The only beneficiary for IP Group 3 (which shares in the revenues for $P_D$, $P_E$, and $P_F$) is Investor B1, who is allocated $259,876 ($129,938 for $P_E$, $64,969 each for $P_D$, and $P_F$). Similarly, the only beneficiary for IP Group 4 (which shares in the revenues for $P_G$) is Investor B1, who is allocated $35,438 for patent $P_G$. Thus, the total allocations to each beneficiary result in a total desired allocation of $945,000.

Note that, if the BTRAS were to include other tiers, in order to have remaining net revenue to share, the allocations at any tier cannot result in fully allocating the remainder. In one alternative embodiment, the tiers are treated hierarchically in a single tier allocation and the percentages adjusted for each beneficiary according to the beneficiary's depth in the tier so as to ensure there is some revenue to share at each level. Other arrangements are also possible.

Given the algorithmic nature of the allocations and retrieval of payment percentages based upon transaction weights, a fair allocation method that uses a BTRAS can be assisted by a computer program (or similar product) that, given the transaction weight information and beneficiary information associated with each asset, determines appropriate allocations for each beneficiary. Moreover, the process may be implemented with a variety of other mathematical algorithms, weighting functions, or other implementation aspects.

Figure 6:
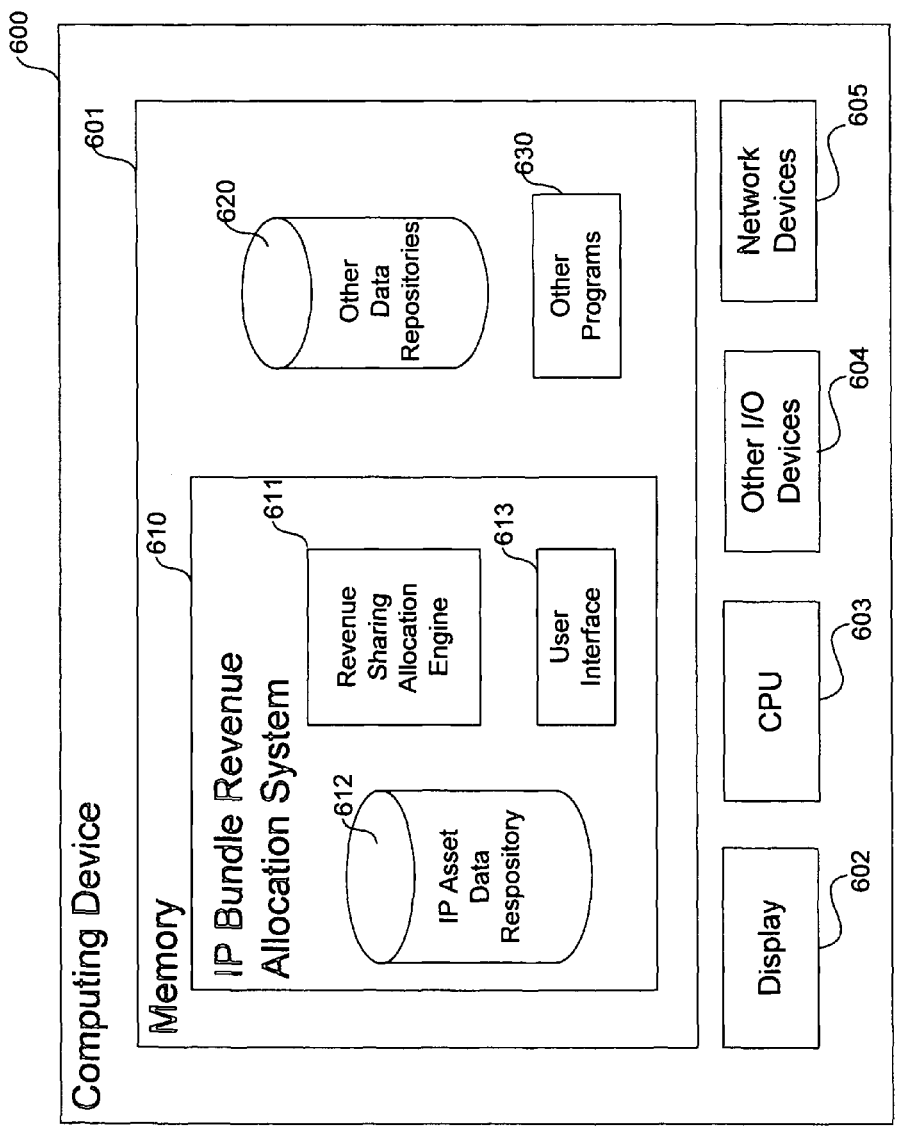
FIG. 6 is an example block diagram of a general purpose computer system for assisting in practicing embodiments of a bundled and tiered revenue allocation scheme.

FIG. 6 is an example block diagram of a general purpose computer system for assisting in practicing embodiments of a bundled and tiered revenue allocation scheme. The general purpose computer system 600 may comprise one or more server and/or client computing systems and may span distributed locations. In addition, each block shown may represent one or more such blocks as appropriate to a specific embodiment or may be combined with other blocks. Moreover, the various blocks of an IP Bundle Revenue Allocation System 610 may physically reside on one or more machines, which use standard or specialized interprocess communication mechanisms to communicate with each other.

In the embodiment shown, computer system 600 comprises a computer memory ("memory") 601, a display 602, a Central Processing Unit ("CPU") 603, Input/Output devices 604, and Network Devices 605. The IP Bundle Revenue Allocation System 610 is shown residing in memory 601. In a typical embodiment, the components of such a system may include an IP Asset Data Repository 612 for storing information regarding the assets, which may be used to determine transaction sensitive weights and associations between assets and beneficiaries. The IP Bundle Revenue Allocation System 610 may also include a user interface 613 and a revenue sharing allocation engine 611, which processes IP Bundle licensing fees and determines appropriate allocations for revenue sharing. The components of the IP Bundle Revenue Allocation System 610 preferably execute on CPU 603 and manage the generation and use of fair allocations, as described in previous figures. Other downloaded code 630 and potentially other data repositories 620 also reside in the memory 610, and preferably execute on one or more CPU's 603.

In an example embodiment, components of the IP Bundle Revenue Allocation System 610 are implemented using standard programming techniques. In addition, programming interfaces to the data stored as part of the allocation process can be available by standard means such as through C, C++, C#, and Java API and through scripting languages such as XML, or through web servers supporting such. The IP asset data repository 612 may be implemented for scalability reasons as a database system rather than as a text file, however any method for storing such information may be used. In addition, revenue sharing allocation engine 611 may be implemented as stored procedures of the IP assets, or methods attached to IP asset "objects," although other techniques are equally effective.

One skilled in the art will recognize that the IP Bundle Revenue Allocation System 610 may be implemented in a distributed environment that is comprised of multiple, even heterogeneous, computer systems and networks. For example, in one embodiment, the allocation engine 611, the user interface 613, and the IP asset data repository 612 are all located in physically different computer systems. In another embodiment, various components of the IP Bundle Revenue Allocation System 610 are hosted each on a separate server machine and may be remotely located from the tables which are stored in the IP asset data repository 612. Different configurations and locations of programs and data are contemplated for use with techniques of the present invention. In example embodiments, these components may execute concurrently and asynchronously; thus the components may communicate using well-known message passing techniques. One skilled in the art will recognize that equivalent synchronous embodiments are also supported.

From the foregoing it will be appreciated that, although specific embodiments of the invention have been described herein for purposes of illustration, various modifications may be made without deviating from the spirit and scope of the invention. For example, one skilled in the art will recognize that the methods for performing a fair allocation for IP transactions discussed herein are applicable to all types of intellectual property assets. Further, while exemplary embodiments of the allocation schemes are presented in the context of IP assets and IP transactions, the methods, systems, techniques, and other aspects described herein are applicable to other types of intangible assets, such as revenue bearing instruments or other intangible items. One skilled in the art will also recognize that the systems and computer-implemented versions of the methods discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer-assisted method of sharing and distributing revenue among a plurality of beneficiaries that include at least two types of beneficiaries having different beneficial interests, each beneficiary associated with at least one of a plurality of intellectual property ("IP") assets received into an investment fund, comprising:

under control of a computing system, having a memory and a computer processor, storing information representing one or more of the plurality of IP assets received into the investment fund, the information indicating one or more attributes associated with the one or more of the plurality of IP assets;

receiving into the computing system an indication of an intellectual property ("IP") transaction that has transferred rights in an IP bundle to a transferee in exchange for a received fee, the IP bundle including a collection of assets formed at least in part from the plurality of IP assets received into the investment fund, wherein at least two of the IP assets in the collection of assets included in the IP bundle are associated with different asset providers;

for each respective asset of the plurality of IP assets transferred in the IP transaction, under control of the computing system, dynamically determining and assigning a transaction weight to the respective IP asset indicative of a per asset payment proportion, the transaction weight based upon a rating of contribution of the respective IP asset to the IP transaction, the rating of contribution based in part on the stored information including the one or more indicated attributes associated with the respective IP asset, the rating of contribution also determined at least in part as a function of an attribute of the respective IP asset and determined at least in part as a function of a role of the respective IP asset to the IP transaction wherein the role is indicative of relevance of the respective IP asset in negotiations of the IP transaction, and wherein the transaction weight indicates a percentage of the received fee that is to be split between beneficiaries of the IP assets transferred in the IP transaction that are assigned a same transaction weight in the IP bundle;

for at least a first beneficiary of a first beneficiary type, allocating a portion of the received fee based upon the per asset payment proportion indicated by the transaction weight assigned to one of the plurality of IP assets, the one IP asset associated with the first beneficiary;

determining a net fee that excludes the portion allocated to at least the first beneficiary;

allocating a portion of the net fee to a second beneficiary of a second beneficiary type, having a different beneficial interest from the first beneficiary, based at least in part upon the per asset payment proportion indicated by the transaction weight assigned to another one of the plurality of IP assets, the another one IP asset associated with the second beneficiary; and causing the allocated portions of the fee and net fee to be distributed to beneficiaries in accordance with the determined allocations.

2. The method of claim 1 wherein the transaction is a licensing transaction.

3. The method of claim 2 wherein the received fee is a licensing fee.

4. The method of claim 1 wherein the IP transaction further comprises a plurality of non-IP assets.

5. The method of claim 1 wherein the IP transaction further comprises at least one tangible asset and at least one intangible asset.

6. The method of claim 1 wherein at least one of the beneficiaries is at least one of an investor, a shareholder, or a limited partner.

7. The method of claim 1 wherein the fee is a licensing fee, and further comprising receiving the licensing fee into the investment fund.

8. The method of claim 7 wherein one of the beneficiaries is an investor of the investment fund.

9. The method of claim 1 wherein the determining and assigning the transaction weight to the asset, the transaction weight indicative of a per asset payment proportion, further comprises:

determining and assigning a category to the asset that indicates the percentage of the received fee divided by the number of IP assets in the IP bundle that have been assigned to the category.

10. The method of claim 1 wherein the rating of contribution of the IP asset to the transaction is further determined at least in part as a function of at least one of an attribute of a beneficiary and a role of a licensor.

11. The method of claim 10 wherein the rating of contribution of the IP asset to the transaction that is determined at least in part as a function of an attribute of the IP asset comprises at least one or more of age, litigation history, related assets, number of patent claims, complexity of patent claims, prior interpretation of patent claims, a measure of strength of patent claims, a measure of breadth of patent claims, a correlation of patent claims to respective markets, or a statistical valuation.

12. The method of claim 10 wherein the rating of contribution of the IP asset to the transaction that is determined at least in part as a function of the role of the IP asset to the transaction indicates the relevance of the IP asset in negotiations of the transaction.

13. The method of claim 10 wherein the rating of contribution of the IP asset to the transaction is determined at least in part as a function of an attribute of a beneficiary, including one or more of an allocation priority or preference, the type of beneficial interest associated with the beneficiary, or an identity of the beneficiary.

14. The method of claim 10 wherein the rating of contribution of the IP asset to the transaction is determined at least in part as a function of a role of a licensor, including a measure of difficulty the licensor experiences in effectuating the transaction.

15. The method of claim 1 wherein the first beneficiary type is an asset provider.

16. The method of claim 15 wherein the second beneficiary type is at least one of a strategic partner or a financial partner.

17. The method of claim 1 wherein the second beneficiary type is an asset provider.

18. The method of claim 4 wherein at least one of the transaction weights is assigned to an IP asset based at least in part on the one or more of the plurality of non-IP assets.

19. A non-transitory computer-readable medium containing content for controlling a computing system to allocate revenue from an intellectual property ("IP") transaction among a plurality of beneficiaries that include at least two types of beneficiaries having different beneficial interests, each beneficiary associated with at least one of a plurality of intellectual property ("IP") assets, by performing a method comprising:

receiving an indication of a fee amount transferred in exchange for rights in an IP bundle, the IP bundle including the plurality of IP assets, wherein at least two of the IP assets are associated with different asset providers;

for each respective asset of the plurality of IP assets, dynamically determining and assigning a transaction weight to the respective IP asset indicative of a per asset payment proportion, the transaction weight based upon a determined rating of contribution of the respective IP asset to the IP transaction, the rating of contribution based in part on one or more attributes associated with the respective IP asset, the rating of contribution also determined at least in part as a function of an attribute of the respective IP asset and determined at least in part as a function of a role of the respective IP asset to the IP transaction wherein the role is indicative of relevance of the respective IP asset in negotiations of the IP transaction, and wherein the transaction weight indicates a percentage of the received fee that is to be split between beneficiaries of the IP assets transferred in the IP transaction that are assigned a same transaction weight in the IP bundle;

for each of one or more beneficiaries of a first beneficiary type, allocating a portion of the indicated fee based upon the per asset payment proportion indicated by the determined transaction weight for each of the plurality of IP assets that is associated with that beneficiary;

calculating a net fee that excludes the portions allocated to the one or more beneficiaries of the first beneficiary; and allocating a portion of the net fee to a beneficiary of a second beneficiary type having a different beneficial interest from each of the one or more beneficiaries, based at least in part upon the per asset payment proportion indicated by the determined transaction weight for each of the plurality of IP assets associated with the second beneficiary.

20. The computer-readable medium of claim 19 wherein the computer-readable medium is a memory in a computing device containing the contents and the contents are instructions for controlling the computing system.

21. The computer-readable medium of claim 19, the method further comprising causing the indicated fees to be distributed to the one or more beneficiaries of the first beneficiary type according to the allocated portions of the indicated fee and to the beneficiary of the second beneficiary type according to the allocated portion of the net fee.

22. A computing system for facilitating sharing revenue in a tiered arrangement among a plurality of beneficiaries, wherein at least two of the beneficiaries have different beneficial interests, the revenue received from an intellectual property ("IP") transaction in exchange for rights in an IP bundle that includes a plurality of IP assets, wherein at least two of the IP assets are associated with different asset providers, and wherein each of the plurality of beneficiaries is associated with one or more of the plurality of IP assets, comprising:

a memory;

a processor;

a revenue allocation sharing engine stored on the memory and configured, when executed by the processor, to:

determine one or more beneficiaries associated with a first tier of beneficiaries and one or more beneficiaries associated with a second tier of beneficiaries;

for each respective asset of the plurality of IP assets included in the IP bundle, dynamically assign a transaction weight to the respective asset indicative of a per asset payment proportion, the transaction weight based at least in part upon a rating of contribution of the respective IP asset to the IP transaction, the rating of contribution based in part on one or more attributes associated with the respective IP asset, the rating of contribution also determined at least in part as a function of an attribute of the respective IP asset and determined at least in part as a function of a role of the respective IP asset to the IP transaction wherein the role is indicative of relevance of the respective IP asset in negotiations of the IP transaction, and wherein the transaction weight indicates a percentage of the received revenue that is to be split between beneficiaries of the IP assets transferred in the IP transaction that are assigned a same transaction weight in the IP bundle;

for each of the determined one or more beneficiaries associated with the first tier of beneficiaries, determining an allocation of a portion of the received revenue, the allocation based upon the per asset payment proportion of each of the one or more of the plurality of IP assets associated with the beneficiary, as indicated by the transaction weight and the rating of contribution assigned to each of the one or more of the plurality of IP assets associated with the beneficiary;

determining a net revenue that excludes the allocations of portions determined for the determined one or more beneficiaries of the first tier;

for each of the determined one or more beneficiaries associated with the second tier of beneficiaries, determining an allocation of a portion of the net revenue, the allocation based upon the per asset payment proportion of each of the one or more of the plurality of IP assets associated with the beneficiary, as indicated by the transaction weight assigned to each of the one or more of the plurality of IP assets associated with the beneficiary; and storing an indication of the determined allocations.

23. The computing system of claim 22 wherein one of the tiers of beneficiaries includes IP asset providers.

24. The computing system of claim 22 wherein one of the tiers of beneficiaries includes at least one of an investor, a shareholder, a strategic partner, or a financial partner.

25. A computer-assisted method of sharing revenue, resulting from an intellectual property transaction, among a plurality of beneficiaries that include at least two types of beneficiaries having different beneficial interests, each beneficiary associated with at least one of a plurality of intellectual property ("IP") assets, comprising:

receiving an indication that rights in an IP bundle have been transferred in a transaction to a transferee in exchange for a fee, the IP bundle including the plurality of IP assets, wherein at least two of the plurality of IP assets are associated with different asset providers;

under control of a computing system, for each respective asset of the plurality of IP assets, dynamically assigning a transaction weight to the respective IP asset indicative of a per asset payment proportion, the transaction weight based upon a determined rating of contribution of the respective IP asset to the transaction, the rating of contribution based in part on one or more attributes associated with the respective IP asset, and the rating of contribution also determined as a function of an attribute of the respective IP asset, a role of the respective IP asset to the transaction, an attribute of one or more of the beneficiaries, and a role of the licensor, the role of the respective IP asset to the transaction indicative of relevance of the respective IP asset in negotiations of the transaction, and wherein the transaction weight indicates a percentage of the fee that is to be split between beneficiaries of the IP assets transferred in the transaction that are assigned a same transaction weight in the IP bundle for at least a first beneficiary of a first beneficiary type, allocating a portion of the fee based upon the per asset payment proportion indicated by the transaction weight assigned to one of the plurality of IP assets, the one IP asset associated with the first beneficiary;

determining a net fee that excludes the portion allocated to at least the first beneficiary;

allocating a portion of the net fee to a second beneficiary of a second beneficiary type, having a different beneficial interest from the first beneficiary, based at least in part upon the per asset payment proportion indicated by the transaction weight assigned to another one of the plurality of IP assets, the another one IP asset associated with the second beneficiary; and indicating the allocated portions so that the first beneficiary and the second beneficiary can receive payments from the fee in accordance with the allocated portions.

26. The method of claim 25 wherein at least one of the two types of tier of beneficiaries includes an IP asset provider.

27. The method of claim 25 wherein at least one of the two types of tier of beneficiaries includes at least one of a strategic partner or a financial partner.

28. The method of claim 25 wherein the transaction includes at least one non-IP asset and at least one of the transaction weights is assigned to an IP asset based at least in part on the non-IP asset.

* * * * *